Figure 1:
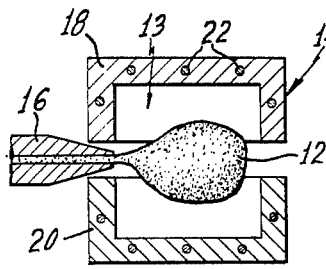

May 24, 1966   P. W. HARDY ETAL   3,253,066
METHOD OF FORMING FOAMED PLASTIC ARTICLES
Filed June 19, 1963

INVENTORS
PAUL WILSON HARDY
ORRIN MARTEL PETERSON
BY Leonard R. Kohan
George W. Reiber
ATTORNEYS 3,253,066
METHOD OF FORMING FOAMED
PLASTIC ARTICLES
Paul Wilson Hardy, Barrington, and Orrin Martel Peterson, Crystal Lake, Ill., assignors to American Can Company, New York, N.Y., a corporation of New Jersey
Filed June 19, 1963, Ser. No. 289,009
4 Claims. (Cl. 264—51)

The present invention relates to a method of molding foamed articles from expandable thermoplastic materials and more particularly to the molding of expandable granules of thermoplastic material by extruding a viscous semi-expanded mass of expandable thermoplastic into a mold and allowing the foamable material to complete its expansion within the mold.

The prior art discloses articles, such as floats, buoys, insulating containers, and the like being molded from partially expanded beads of polystyrene or other expandable thermoplastic material by exposing partially expanded beads within the mold to steam, in order to complete the expansion and fuse the beads. Among the difficulties encountered with articles molded by this method are long molding cycles and poor durability of the molded articles.

Another method shown by the prior art involves molding articles by injecting a plastic mass above its foaming temperature, but under a restraining pressure, into a complicated mold in order to provide a core of foam with a skin of solid thermoplastic material. The mold is provided with retractable walls in order to obtain expansion of the foamable thermoplastic between an inner and outer skin of solid thermoplastic material.

A method of continuously molding extruded foam thermoplastic is shown in United States Patent 2,905,972. However, the method related in this patent pertains to extruding foamable thermoplastic into a forming die which is defined by a plurality of surfaces that are driven in the direction of extrusion. This method is generally limited to the production of rod or sheet-type materials.

It is therefore an object of the present invention to provide a method of producing irregular shaped low density thermoplastic articles.

Another object is to provide a method for forming articles from granules of expandable thermoplastic without requiring pre-expansion of the granules.

A further object is to provide a method of molding articles of foamable thermoplastic having a tough durable skin of solid thermoplastic and a cellular foamed thermoplastic interior.

A still further object is to provide a rapid and simple method of producing a thermoplastic foamed article.

Numerous other objects and advantages of the invention will be apparent as it is better understood from the following description, which, taken in connection with the accompanying drawings, discloses a preferred embodiment thereof.

The above objects are accomplished by extruding a predetermined quantity of a substantially viscous expandable thermoplastic into a heated mold, the mold comprising at least two pieces. After the quantity of thermoplastic is extruded into the mold, the mold is held at its elevated temperature for a predetermined period of time, thus allowing the expandable thermoplastic within the mold to expand until it assumes the shape of the mold cavity. Thereafter, the mold and the foam thermoplastic therein are cooled to below the heat distortion temperature of the thermoplastic. The mold is then opened and the expanded thermoplastic article having a foamed core and a surface skin of solid thermoplastic is removed from the mold.

Figure 2:
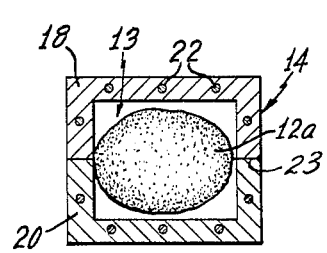
Figure 3:
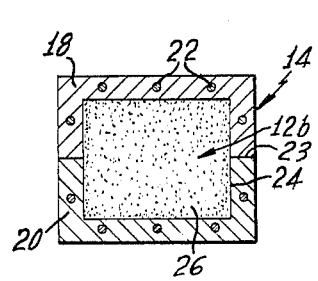
Figure 4:
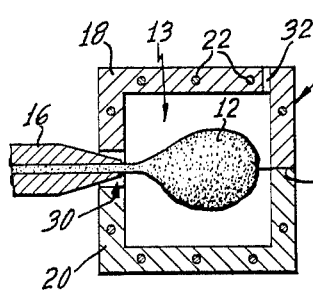
Figure 5:
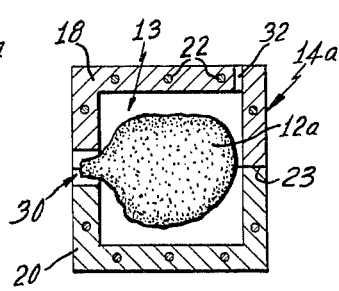
Figure 6:
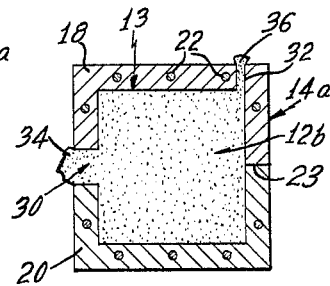
Figure 7:
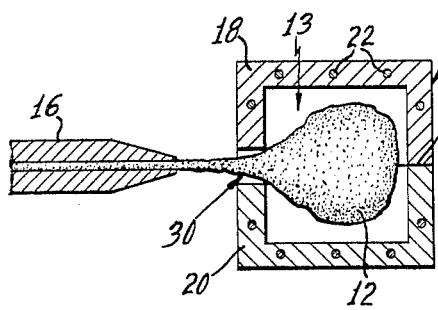
Figure 8:
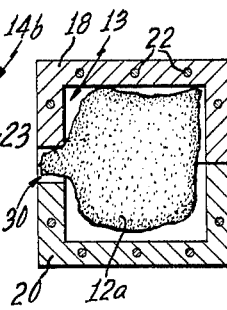
Figure 9:
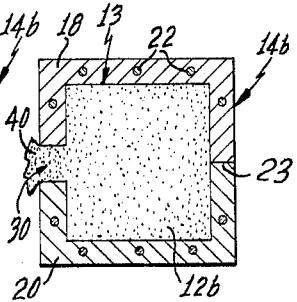

Referring to the drawings:
FIG. 1 is a sectional view of one form of apparatus for performing a step in the method of the instant invention;
FIG. 2 is a sectional view showing a subsequent step of the method;
FIG. 3 is a setcional view showing a further step in the sequence of the method;
FIGS. 4 through 6 are views similar to FIGS. 1, 2 and 3 respectively but showing a modified form of the invention; and
FIGS. 7 through 9 are views similar to FIGS. 1, 2 and 3 respectively but showing another modification of the invention.

In practicing the method of this invention, granules of thermoplastic resins, e.g. polystyrene, polyethylene, polypropylene, polyvinyl acetate, and polyvinyl chloride containing about 5 to 10% by weight of a volatile blowing agent such as methyl chloride, pentane, methyl ether, methyl ethyl ether, butane, hexane, heptane, methanol, methylacetate, sym-dichlorotetrafluorethane, and the like dispersed within the granules, are placed into a conventional three zone extruder, although other type extruders may be used without departing from the scope of this invention. Ordinary thermoplastic, together with an unincorporated quantity of blowing agent may also be added to the extruder. Numerous other blowing agents may also be utilized, such as those enumerated in U.S. Patent 2,905,972.

In the first zone of the extruder, the thermoplastic is heated to a temperature above its softening point and above the temperature normally required to volatilize the blowing agent. In order to prevent the blowing agent from volatilizing, pressure is developed within the extruder, such as by reduction of the extruder channel's effective diameter through the increase of the extruder screw groove diameter in the manner of a spiral inclined plane. Once in the molten condition, the viscous mass is passed through a holding zone where the temperature of the mass is maintained above the volatilization temperature of the blowing agent. It will be readily understood that the temperature and pressure requirements will vary depending upon the particular thermoplastic and blowing agent utilized. By means of the pressure developed by the extruder screw upon the viscous thermoplastic mass, the melt is then forced out of the extruder.

As a preferred or exemplary embodiment of the instant invention, FIG. 1 illustrates a viscous thermoplastic melt 12 being extruded into the cavity 13 of a closable heated mold, generally designated 14, through a delivery tube 16 from the extruder. During passage through the delivery tube 16 the melt is prevented from expanding by the constricted cross-section of the delivery tube 16.

The mold itself is generally of two-piece construction having an upper cope 18 and a lower drag 20. In the molding of certain intricate shapes it may be desirable to have a mold consisting of more than two pieces, but for the purpose of this description a 2-piece mold will be utilized. The mold 14 is heated by suitable means such as electrical resistance heating wires 22 imbedded therein. Of course, many other methods of heating may also be employed without departing from the scope of this invention.

Once a sufficient quantity of the thermoplastic melt 12 has been extruded into the open mold 14 the delivery tube 16 is withdrawn from the interior of the mold and the extruded melt 12 is severed from the continuously extruding thermoplastic issuing from the tube 16, by suitable means such as a knife, not shown.

As soon as the melt 12 is severed, the open mold 14 is closed. If desired, the delivery tube may then be inserted into another open mold and the process repeated.

As is shown in FIG. 2, the thermoplastic melt 12a continues its expansion within the now closed heated mold 14. After a suitable period of time, depending upon the size and shape of the mold cavity 13, the thermoplastic melt will expand until it completely fills the mold cavity 13, as shown in FIG. 3. It should be understood that the time necessary for expansion and foaming of the thermoplastic within the mold will vary to some degree depending on the particular thermoplastic material, the blowing agent, and the density of the final molded article 12b. In general, this time will be at least 5 seconds and usually not more than 60 seconds.

During expansion, the air within the cavity 13 will escape at juncture 23 of the mold parts. Although air may be vented through the juncture 23, the leak paths therethrough are not sufficiently large to permit the expanding plastic 12b to pass.

After the mold 14 has been held at its heated temperature for a time sufficient to complete the expansion of the thermoplastic, the mold 14 and its contents are cooled to a temperature below the heat distortion temperature of the thermoplastic, preferably by exposing the closed mold to cold tap water.

Once the mold 14 and its contents have been cooled below the heat distortion temperature of the thermoplastic, the mold may be opened and the foam thermoplastic article 12b therein may be removed from the mold without further expansion of the now solid thermoplastic.

Preferably the expanded thermoplastic article 12b will have a tough durable skin 24 of solid thermoplastic completely encapsulating a cellular core 26. It is possible, however, to so control the process that the final article will be entirely cellular, without the formation of the solid thermoplastic skin 24. This is done by controlling the quantity of melt extruded into the mold and the temperature of the heated mold itself. Further, the density of the finished foamed plastic article can be varied by varying the quantity of foamable plastic extruded into the mold. In the instant invention, the foamable plastic is retained in the mold and the mold heated until the foamed plastic fills the entire mold cavity. Therefore, by charging a mold having a cavity of given volume initially with more or less foamable plastic, the finished article will have a respectively higher or lower density.

Another form of the invention is shown in FIGS. 4, 5 and 6. In this method the mold 14a has a sprue 30 through which the thermoplastic melt 12 is extruded and a riser 32 through which gas within the mold may escape, thereby assisting uniform expansion of the melt 12.

The delivery tube 16 is placed flush with or into the sprue 30 and a predetermined quantity of the viscous thermoplastic melt 12 is extruded into the mold cavity 13. After extrusion of the predetermined quantity of melt 12 the delivery tube 16 is removed and the extruded melt 12 is severed from the tube 16. The melt 12a then begins expanding and continues its expansion until the melt completely fills the mold cavity 13 and a quantity of foamed thermoplastic 34 and 36 extend into the sprue 30 and the riser 32, respectively.

When a tight fit is desired between the cope 18 and the drag 20, venting through the juncture 23 will necessarily be restricted. In this case the riser 32 will serve as a vent for the air within the cavity 13 during expansion of the melt 12a.

The mold is then cooled to below the heat distortion temperature of the expanded thermoplastic article 12b by exposing the mold 14a and its contents to cool water. Once the mold 14a and expanded thermoplastic 12b have been cooled, the mold is opened and the foam thermoplastic article is removed from the mold 14a without further expansion and foaming of the thermoplastic. Afterward the thermoplastic risers 34 and 36 may be severed from the foamed article 12b. By regulating the size and/or location of the risers 34, 36 in relation to the shape of the article 12b, any undesirable effect resulting from their severance can be minimized.

Another method of this invention for producing an extrusion molded foamed thermoplastic article is shown in FIGS. 7, 8 and 9. A predetermined quantity of viscous thermoplastic melt 12 is extruded through the sprue 30 of a mold 14b. The delivery tube 16 of the extruder is spaced from the mouth of the sprue 30 a predetermined distance, such that the melt 12 will not expand to a cross-section greater than the sprue 30. Although the extrusion, as shown in FIG. 7, is being done horizontally, it is apparent that the extrusion could be carried out in a vertically downward direction without departing from the scope of the invention. In addition, the spacing between the delivery tube 16 and the sprue 30 may vary provided the tube 16 does not seal off the mouth of the sprue 30 nor is spaced so far from the sprue 30 as to cause the melt 12 to fail to be extruded directly into the cavity 13 before undue expansion of the melt 12. Once the predetermined quantity of melt 12 has been extruded into the mold 14b, the extruded melt 12 is severed from the remainder of the thermoplastic issuing from the delivery tube 16.

The heated mold 14b and the extruded melt 12a therein are allowed to remain at the elevated temperature of the mold for a predetermined time sufficient to allow for expansion and foaming of the melt 12a. Upon complete expansion, the now fully expanded melt fills the interior cavity 13 of the mold forming a foamed article 12b and a quantity of foam thermoplastic 40 extends into the sprue 30.

Thereafter the mold 14b and its contents are cooled to below the heat distortion temperature of the thermoplastic, preferably by exposing both to cold water. Once the mold 14b and its contents are below the heat distortion temperature of the thermoplastic, the mold is opened and the foamed molded article 12b is removed without further expansion of the now foamed thermoplastic.

It is readily understood that certain conditions will vary in the hereinbefore described process depending upon the particular expandable thermoplastic utilized. Table I lists some of the common blowing agents that may be used with the different thermoplastics. In addition, temperatures involved in the molding process will vary depending upon the materials employed and the density and conformation desired in the foamed thermoplastic article produced by the process.

TABLE I

| Thermoplastic | Blowing Agents | Extrusion Temperature, °F. | Mold Temperature, °F. | Expansion Time in Mold Seconds |
|---|---|---|---|---|
| Low Density Polyethylene. | Nitrourea, Terephthalazide, N-N' dimethyl, N-N' dinitroso terephthalamide. | 250–355 | 255–325 | 30–60 |
| High Density Polyethylene. | 3,3' disulphahydrazidodiphenylsulfone. | 300–375 | 300–425 | 30–60 |
| Polypropylene | Dinitrosopentamethylenetetramine. | 355–375 | 350–380 | 30–60 |
| Polyvinyl Chloride and Polyvinylchloride-Vinyl Acetate Copolymers. | Nitrourea, Terephthalazide, N-N' dimethyl, N-N' dinitrosoterephthalamide. | 220–285 | 190–310 | 30–60 |
| Polystyrene | n-Heptane, n-hexane, methyl ethyl ether, methyl chloride. | 225–275 | 190–320 | 30–60 |

The following examples are by way of explanation and are not to be considered limitations on the invention.

*Example 1*

A quantity of expandable polystyrene such as Koppers, Dylite K.F.P. 133, having 0.25 percent citric acid and 0.325 percent sodium bicarbonate internally incorporated therein as nucleating agents, was placed in an extruder together with 0.05 percent by weight of an oil-soluble dye to impart color to the material. The molecular weight range for the expandable polystyrene was 150,000 to 200,000. The blowing agent used was n-heptane, which was present in a concentration of 5% by weight of the polymer.

Within the extruder the polymer was heated to a temperature of 240° F. and was maintained at this temperature until it left the extruder delivery tube. A two-piece closable mold was heated to a temperature of 300° F. and the delivery tube of the extruder was placed within the mold cavity. A predetermined quantity of the expandable polystyrene was extruded into the mold cavity until the cavity was partially filled. The quantity of polymer delivered by the extruder was then separated from the continually extruding mass and the delivery tube was removed from the mold. Immediately the mold was closed to prevent the expanding thermoplastic from spilling outside the confines of the mold cavity. The closed mold was then held at a temperature of 300° F. for one minute while the polystyrene expanded to fill the mold. The mold and its contents were then placed in cool tap water until the temperature was reduced to about 100° F. The mold was then separated and a solid thermoplastic article with a density of 12.3 pounds per cubic foot having a skin of solid polystyrene completely surrounding a foam polystyrene core was removed from the mold.

*Example 2*

A quantity of foamable polystyrene similar to that described in Example 1, but having approximately half the weight and a temperature of 255° F. was extruded into the cavity of a closable mold which had been preheated to a temperature of 260° F. The quantity of polystyrene was severed from that issuing from the extruder and the mold was closed. After being held at the 260° temperature for one minute and then water-cooled to 100° F. the mold was opened and a foamed polystyrene article, having a density of 7.7 pounds per cubic foot and being fully expanded without any substantial skin of solid polystyrene, was removed from the mold.

*Example 3*

A quantity of expandable polyethylene having a molecular weight range of 18,000 to 25,000 was placed in an extruder together with a decomposable blowing agent, e.g. 5 percent nitrourea. Within the extruder, the polymer and blowing agent were heated to a temperature of 335° F. Upon being thoroughly mixed within the extruder, the melt was extruded into a mold which had been preheated to a temperature of 300° F. in a manner similar to that described in Example 1. After being held for one minute at 300° F., the mold and its contents were water-cooled to room temperature. The mold was then opened and the foamed polyethylene article removed. This foamed article had a skin of substantially solid polyethylene and a cellular core. The density of the article was approximately 26.75 pounds per cubic foot.

It is thought that the invention and many of its attendant advantages will be understood from the foregoing description, and it will be apparent that changes may be made in the steps of the method described in the order of accomplishment without departing from the spirit and scope of the invention or sacrificing all of its material advantages, the form hereinbefore described being merely the preferred embodiment thereof.

We claim:
1. A method for molding expandable thermoplastic articles, comprising the steps of:
   extruding a quantity of a substantially viscous expandable thermoplastic into an open closable heated mold having at least two separable parts; allowing said thermoplastic to partially expand within said mold;
   then closing said mold to substantially define a cavity therein free of any opening to the exterior of said mold;
   holding said predetermined quantity of viscous expandable thermoplastic within said mold for a period of time at the temperature of said mold, thus allowing said thermoplastic to expand until said thermoplastic fills and assumes the shape of said cavity;
   and cooling the mold and the foamed thermoplastic therein to a temperature below said foamed thermoplastic's heat distortion temperature thereby forming a shaped foamed thermoplastic article.

2. The method of claim 1 wherein said thermoplastic is polystyrene.
3. The method of claim 1 wherein said thermoplastic is polyethylene.
4. The method of claim 1 wherein said thermoplastic is polypropylene.

References Cited by the Examiner

UNITED STATES PATENTS

| | | | |
|---|---|---|---|
| 2,525,880 | 10/1950 | Feldman | 264—55 |
| 2,525,965 | 10/1950 | Smith | 264—55 |
| 2,797,443 | 7/1957 | Carlson | 264—53 XR |
| 2,829,117 | 4/1958 | Lindemann | 264—51 XR |
| 3,058,161 | 10/1962 | Beyer et al. | 264—47 |
| 3,069,170 | 12/1962 | Dillon | 264—53 XR |
| 3,192,297 | 6/1965 | Gringras | 264—328 |

OTHER REFERENCES

Modern Plastics, "New Techniques for Processing Expandable Styrene Foam," September 1960, pp. 113–115, 193, 196, 198, 200 and 202.

Plastics World, "Injection Molding Expandable Polystyrene Beads," January 1962, pp. 18–20.

ALEXANDER H. BRODMERKEL, *Primary Examiner.*

P. E. ANDERSON, *Assistant Examiner.*